US009948111B2

(12) United States Patent
Lee et al.

(10) Patent No.: US 9,948,111 B2
(45) Date of Patent: Apr. 17, 2018

(54) DRIVER-FRIENDLY ELECTRICAL LOAD CONTROL METHOD AND APPARATUS

(71) Applicant: Hyundai Motor Company, Seoul (KR)

(72) Inventors: Young Il Lee, Gyeonggi-do (KR); Tae Hoon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 171 days.

(21) Appl. No.: 15/008,741

(22) Filed: Jan. 28, 2016

(65) Prior Publication Data

US 2017/0141580 A1 May 18, 2017

(30) Foreign Application Priority Data

Nov. 17, 2015 (KR) .................. 10-2015-0161064

(51) Int. Cl.
*H02J 3/14* (2006.01)
*H02J 4/00* (2006.01)
*H02J 1/14* (2006.01)
*H02J 7/00* (2006.01)

(52) U.S. Cl.
CPC .................. *H02J 4/00* (2013.01); *H02J 1/14* (2013.01); *H02J 7/0063* (2013.01)

(58) Field of Classification Search
None
See application file for complete search history.

(56) References Cited

U.S. PATENT DOCUMENTS

| 9,126,544 | B2 * | 9/2015 | Larson | B60R 16/03 |
| 9,352,635 | B1 * | 5/2016 | Schepmann | B60H 1/00392 |
| 9,575,550 | B1 * | 2/2017 | Oiler | G06F 1/329 |
| 2007/0216358 | A1 * | 9/2007 | Iida | H02J 7/0029 320/129 |
| 2009/0015203 | A1 * | 1/2009 | Oakes | G06Q 40/00 320/132 |
| 2013/0257351 | A1 * | 10/2013 | Nishibayashi | H02J 7/00 320/107 |
| 2013/0257384 | A1 * | 10/2013 | Nishibayashi | H02J 7/0013 320/134 |

(Continued)

FOREIGN PATENT DOCUMENTS

| EP | 2 295 300 A1 | 3/2011 |
| JP | 2004-050892 A | 2/2004 |

(Continued)

*Primary Examiner* — Lincoln Donovan
*Assistant Examiner* — Khareem E Almo
(74) *Attorney, Agent, or Firm* — Mintz Levin Cohn Ferris Glovsky and Popeo, P.C.; Peter F. Corless (57) ABSTRACT

An electrical load control method includes: collecting, by an electrical load control apparatus, state information of one or more electrical loads; receiving, by an output device, the state information of the one or more electrical loads from the electrical load control apparatus; outputting, by the output device, the state information; receiving, by an input device, one or more control objects among the one or more electrical loads and control methods for the one or more control objects; and receiving, by the electrical load control apparatus, a signal corresponding to the received one or more control objects and the received control methods for the one or more control objects from the input device to deliver a signal corresponding to a respective control method for each of the one or more control objects.

18 Claims, 7 Drawing Sheets

(56) References Cited

U.S. PATENT DOCUMENTS

2016/0065003 A1* 3/2016 Preston ................ H02M 7/04
307/64

FOREIGN PATENT DOCUMENTS

| | | |
|---|---|---|
| JP | 2006-182198 A | 7/2006 |
| JP | 2007-512989 A | 5/2007 |
| JP | 3932098 B2 | 6/2007 |
| JP | 2008-137472 A | 6/2008 |
| JP | 2010-076595 A | 4/2010 |
| JP | 2010195197 A | 9/2010 |
| JP | 2010-235064 A | 10/2010 |
| JP | 2011-105280 A | 6/2011 |
| JP | 2013-123317 A | 6/2013 |
| KR | 10-1009477 | 1/2011 |

* cited by examiner

ORDER IN WHICH LOADS ARE BLOCKED (SELECT BY EACH DRIVER)

PREFERRED CONTROL LEVEL OF EACH DRIVER

CONTROL LEVEL

DRIVER-FRIENDLY ELECTRICAL LOAD CONTROL METHOD AND APPARATUS

CROSS-REFERENCE TO RELATED APPLICATION

This application claims the benefit of and priority to Korean Patent Application No. 10-2015-0161064, filed on Nov. 17, 2015, which is hereby incorporated by reference as if fully set forth herein.

BACKGROUND OF THE DISCLOSURE

Field of the Disclosure

The present disclosure relates generally to a method and apparatus for controlling energy consumption of a vehicle, and more particularly, to a method and apparatus for differently controlling various electrical loads in a vehicle according to selection by a driver.

Discussion of the Related Art

With increasing amounts of electrical equipment (or electronic sub-assemblies (ESAs)) being equipped in vehicles, electric energy consumption in vehicles has been gradually increasing. As a result, in addition to the power needed for driving a vehicle, additional electric energy is consumed to operate the ESAs. Electric energy consumption for operating the ESAs may result in a decrease in fuel efficiency and an increase in $CO_2$ emissions.

To solve this problem, various electric energy management (EEM) systems have recently been developed. Representative examples of the systems include an alternator management system (AMS) and an idle stop & go (ISG) system. However, these systems approach this problem from the viewpoint of energy production loss.

On the other hand, fewer systems have been developed from the viewpoint of energy consumption, that is, with regard to control of energy consumed by an electrical load, since driver convenience may be degraded if the electrical load is controlled. In other words, when a system that controls an electrical load actively decreases electric energy used for an ESA, the system may change the performance, operation time, or the like of the electrical load irrespective of or contrary to the intention of a driver, which may lead to decrease in driver satisfaction.

Recently, research has been actively conducted on techniques for controlling energy consumed by an electrical load in order to contribute to improvement in fuel efficiency. However, designing a control method which is not contrary to the intention of the driver and does not degrade convenience can be challenging. To address this challenge, the present disclosure proposes a method of efficiently implementing control of an electric load through selection by a driver.

SUMMARY OF THE DISCLOSURE

Accordingly, the present disclosure is directed to a driver-friendly electrical load control method and apparatus that substantially obviate one or more problems due to limitations and disadvantages of the related art.

As explained above, determining a scheme of controlling electrical loads to avoid degradation of driver convenience can be difficult. In this instance, this problem may be solved if a driver has an option to directly set a control object and a control method for the electrical loads. Each driver is allowed to set electrical loads to be controlled by the driver and set priorities of the electrical loads to be controlled such that the electrical loads enter a mode for decreasing energy consumption in ascending order of priority. Thus, the conventional scheme of arbitrarily controlling electrical loads without a user interface is improved such that a driver directly selects electrical loads to be managed and selects control levels for the respective electrical loads, and each electrical load operates according to user input.

Technical problems to be solved by the present disclosure are not limited to the above-mentioned technical problems, and other technical problems not mentioned herein may be clearly understood by those skilled in the art from description below.

To achieve these objects and other advantages and in accordance with the purpose of the disclosure, as embodied and broadly described herein, an electrical load control method includes: collecting, by an electrical load control apparatus, state information of one or more electrical loads; receiving, by an output device, the state information of the one or more electrical loads from the electrical load control apparatus; outputting, by the output device, the state information; receiving, by an input device, one or more control objects among the one or more electrical loads and control methods for the one or more control objects; and receiving, by the electrical load control apparatus, a signal corresponding to the received one or more control objects and the received control methods for the one or more control objects from the input device to deliver a signal corresponding to a respective control method for each of the one or more control objects.

The receiving of the signal may include identifying the one or more control objects among the one or more electrical loads, and identifying a control mode selected from one or more control modes.

The receiving of the one or more control objects and the control methods may include providing, by the input device, information about each of the one or more control modes for each of the one or more control objects.

The state information may include at least one of energy consumption, an influence of fuel efficiency, and a current control mode of the one or more electrical loads.

The one or more control modes may be identified according to control levels of the one or more electrical loads.

The one or more control modes may correspond to different control levels of the one or more electrical loads by a predetermined threshold value.

The one or more control modes may be identified according to whether the one or more electrical loads are activated.

The one or more control modes may be identified according to intervals at which the one or more electrical loads are activated.

The electrical load control apparatus may be connected to the one or more electrical loads through controller area network (CAN) communication or hardwire.

The one or more control objects may be classified into at least one combination set in advance for each category.

Priorities may be assigned to the one or more control objects for applying the one or more control modes.

The electrical load control apparatus may be included in an integrated gateway & power module (IGPM) or an integrated control unit (ICU).

Furthermore, according to embodiments of the present disclosure, an electrical load control apparatus includes: a communication module receiving state information collected from one or more electrical loads and transmitting the received state information to an output device; and a control module receiving one or more control objects among the one or more electrical loads and control methods for the one or more control objects from an input device to identify the received one or more control objects and the received control methods. The communication module delivers a signal corresponding to a respective control method for each of the one or more control objects.

The state information may include at least one of energy consumption, an influence of fuel efficiency, and a current control mode of the one or more electrical loads.

The one or more control modes may be identified according to control levels of the one or more electrical loads.

The one or more control modes may correspond to different control levels of the one or more electrical loads by a predetermined threshold value.

The one or more control modes may be identified according to whether the one or more electrical loads are activated.

The one or more control modes may be identified according to intervals at which the one or more electrical loads are activated.

The communication module may exchange a signal with the one or more electrical loads through CAN communication or hardwire.

The one or more control objects may be classified into at least one combination set in advance for each category.

Priorities may be assigned to the one or more control objects for applying the one or more control modes.

Furthermore, according to embodiments of the present disclosure, a non-transitory computer-readable medium containing program instructions for controlling an electronic load includes: program instructions that collect state information of one or more electrical loads; program instructions that receive the collected state information of the one or more electrical loads; program instructions that output the state information; program instructions that receive one or more control objects among the one or more electrical loads and control methods for the one or more control objects; and program instructions that receive a signal corresponding to the received one or more control objects and the received control methods for the one or more control objects to deliver a signal corresponding to a respective control method for each of the one or more control objects.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to an apparatus and various methods to which the preferred embodiments of the present disclosure are applied. As those skilled in the art would realize, the described embodiments may be modified in various different ways, all without departing from the spirit or scope of the present disclosure. Further, throughout the specification, like reference numerals refer to like elements.

The suffixes "module" and "unit" of elements herein are used for convenience of description and thus can be used interchangeably and do not have any distinguishable meanings or functions. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one processor specifically programmed to execute program instructions stored in a memory to perform one or more processes which are described further below. Moreover, it is understood that the below methods may be executed by an apparatus comprising the processor and/or memory in conjunction with one or more other components, as would be appreciated by a person of ordinary skill in the art.

Furthermore, the processor of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

When a known technology related to description of the disclosure is clear to those skilled in the art, and thus is determined to unnecessarily obscure the subject matter of the disclosure, a detailed description thereof will be omitted.

A general technology for controlling an electrical load related to an electrical load control apparatus corresponding to the present disclosure will be described with reference to FIGS. 1 and 2, and a problem generated by the general technology for controlling the electrical load will be described with reference to FIG. 3.

Then, to solve the problem, a driver-friendly electrical load control method and apparatus corresponding to embodiments of the present disclosure will be described with reference to FIGS. 4 to 8, and an effect of the embodiments of the present disclosure will be described with reference to FIG. 9.

Figure 1:
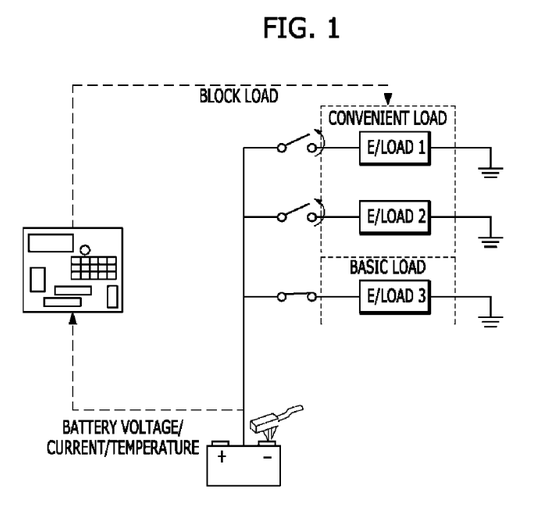
FIG. 1 is a diagram for description of an electrical load switching control method related to an electrical load control method.

FIG. 1 is a diagram for description of an electrical load switching control method related to the electrical load control method.

In general, the electrical load control method is restricted to a technology related to blocking of dark current. However, management of blocking of dark current is restricted when an inactive electrical load control method, which is performed only when an engine is turned OFF, is used.

On the other hand, the electrical load switching control method is an active method that controls an electrical load even when the engine is in an inactive state, and a main object of the electrical load switching control method is to secure startability of a battery. In other words, the electrical load switching control method is a method for securing restartability by verifying a state of charge (SOC) of the battery. The electrical load switching control method increases power by enhancing RPM simultaneously with blocking a load that does not affect driving and safety when a battery state is less than or equal to a reference value.

However, in the electrical load switching control method, a type, an order and a performance decrease value of a blocked load are arbitrarily set in advance irrespective of intention of a driver while the engine is in an active state, and thus the driver may be dissatisfied with degradation of convenience.

Figure 2:
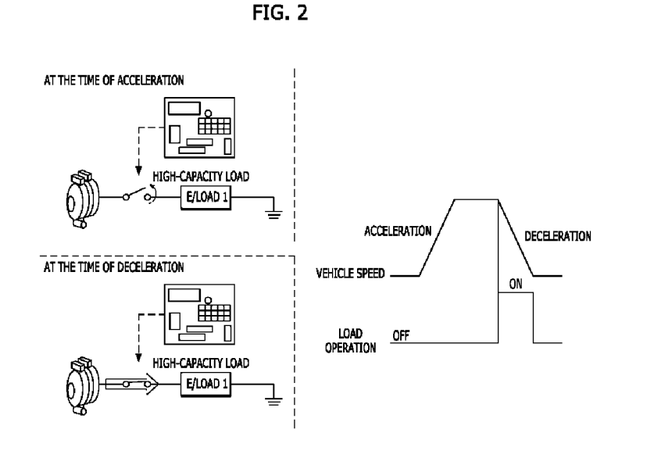
FIG. 2 is a diagram for description of an electrical load scheduling control method related to the electrical load control method.

FIG. 2 is a diagram for description of an electrical load scheduling control method related to the electrical load control method.

The electrical load scheduling control method serves to determine a state of a vehicle (e.g., a battery state, an accelerating state, a constant-speed state, and a decelerating state) during driving to perform a control operation such that electrical loads unrelated to driving are blocked according to circumstance, thereby efficiently using energy.

For example, use of an electrical load is blocked when power is to be used, for example, when the vehicle is accelerated, and use of the electrical load is allowed in a deceleration interval. In addition, in a constant-speed interval, activation of the electrical load is appropriately controlled according to a ratio of the deceleration interval to an acceleration interval.

However, similar to the electrical load switching control method of FIG. 1, the electrical load scheduling control method may cause dissatisfaction with driver convenience since a type and an order of a blocked load is arbitrarily determined when a load is blocked during driving. Moreover, the electrical load scheduling control method is frequently focused on whether to activate an electric load in the acceleration or deceleration interval. Thus, a lot of loads cannot be switched in order not to degrade driver convenience. In other words, the method is restricted only to a load which cannot be immediately recognized by the driver. Main examples of this load may include a load related to air conditioning and heating. Therefore, while the method is effective in improving fuel efficiency in summer and winter, fuel efficiency improvement effect is reduced in spring and autumn.

Figure 3:
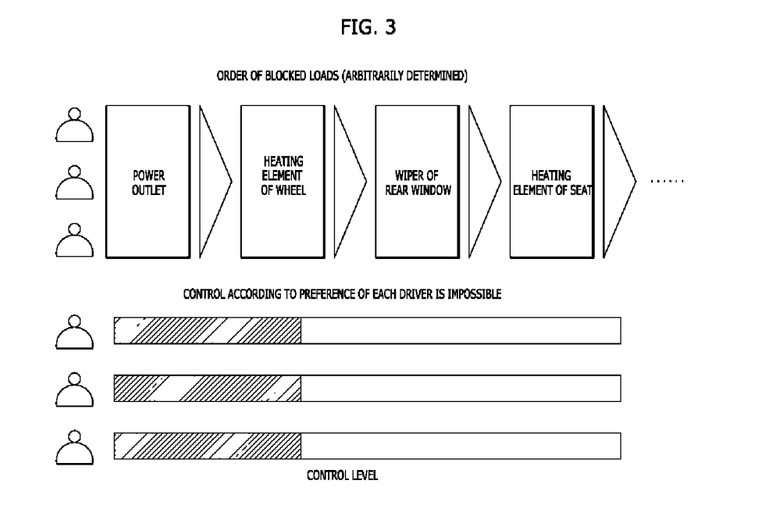
FIG. 3 is a diagram for description of a control object and a control level according to a general electrical load control apparatus.

FIG. 3 is a diagram for description of a control object and a control level according to the general electrical load control apparatus.

In the electrical load control method of FIGS. 1 and 2, order of blocked loads is arbitrarily determined irrespective of intention of the driver. Therefore, driver convenience may be degraded. Moreover, a control level according to preference of each driver cannot be controlled. In other words, the above-mentioned problems may occur since a control object cannot be selected from a plurality of electrical loads and a control method for the control object cannot be selected.

Hereinafter, a description will be given of a driver-friendly electrical load control method and apparatus as embodiments of the present disclosure for solving the above-mentioned problems with reference to FIGS. 4 to 9.

Figure 4:
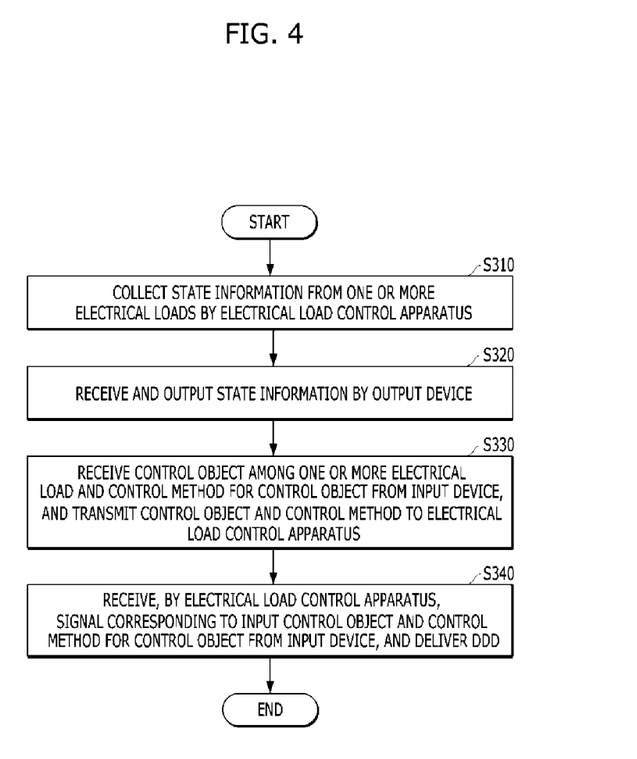
FIG. 4 is a flowchart illustrating a driver-friendly electrical load control method according to embodiments of the present disclosure.

FIG. 4 illustrates the driver-friendly electrical load control method according to embodiments of the present disclosure.

In S310, the electrical load control apparatus collects state information from at least one electrical load. The electrical load control apparatus may be connected to a plurality of electrical loads included in a vehicle through a controller area network (CAN) or hardwire. Further, each of the electrical loads may include a sensor therein for sensing information about an internal state thereof. The state information may include at least one of energy consumption, an influence of fuel efficiency, and a current control mode of the electrical load, but is not restricted thereto.

According to embodiments, the electrical load control apparatus may continuously collect the state information in real time or collect the state information at constant intervals. Further, the electrical load control apparatus may collect the state information of each of the electrical loads and store the collected state information in an internal memory.

After the electrical load control apparatus collects the state information from each of the electrical loads, an output device receives the state information delivered from the electrical load control apparatus to output the state information in S320. The output device may correspond to a display device, and an audio video navigation (AVN) system may include the display device. The display device may be embodied as a touchscreen by having a mutual layer structure with a touch sensor or being integrated with the touch sensor. The touchscreen may function as an input device for providing an input interface between the AVN system and the driver, and provide an output interface between the AVN system and the driver at the same time.

In S330, an input device receives at least one control object among one or more electric loads and a control method for the at least one control object and transmits information about the control object and the control method to the electrical load control apparatus.

After checking electrical loads and state information of the electrical loads output to the output device, the driver may select at least one control object from the electrical loads, and select and input a control method for the selected control object.

Details with regard to S320 and S330 will be described in detail through a user interface in FIG. 5.

In S340, the electrical load control apparatus receives a signal corresponding to the input control object and control method for the control object from the input device, and delivers the signal corresponding to the control method to each control object.

The electrical load control apparatus identifies at least one control object selected from connected electrical loads and a selected control mode and then delivers a signal corresponding to the selected control mode to each control object. An electrical load receiving the signal may operate in the selected control mode.

Figure 5:
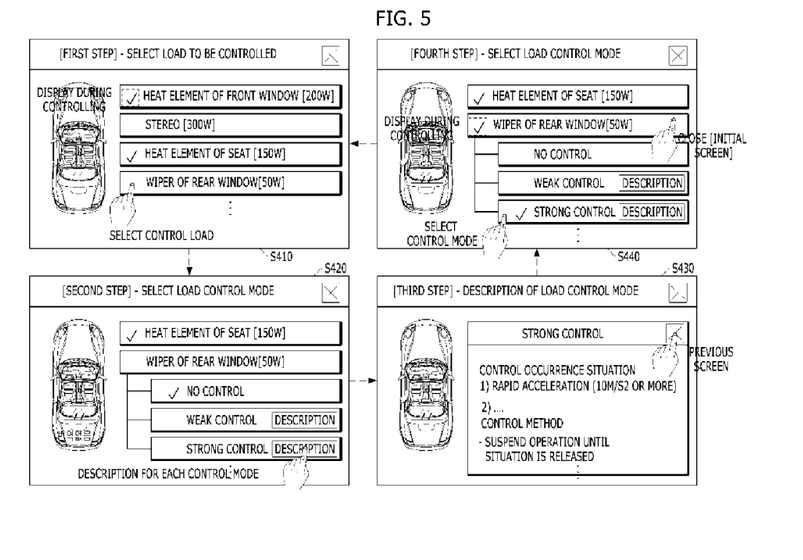
FIG. 5 is a diagram for description of a user interface provided in the driver-friendly electrical load control method according to embodiments of the present disclosure.

FIG. 5 is a diagram for description of a user interface provided in the driver-friendly electrical load control method according to embodiments of the present disclosure.

In a first step, the output device displays a plurality of electrical loads and information about energy consumption of each of the electrical loads such that the driver may select a control object in S410. In addition, the output device may display a selected control object.

For example, "a heat element of a front window" is displayed among the electrical loads, and "200 W" corresponding to energy consumption thereof is displayed. In addition, a checkmark may be displayed to indicate that the electrical load is a control object.

In a second step, the output device displays a plurality of control modes such that a control mode of an electrical load may be selected in S420.

For example, when the driver selects a "rear window wiper" as the control object in the first step, "no control", "weak control", and "strong control" may be displayed as a control mode for the control object. In addition, a position of the selected control object may be displayed on a vehicle image. Further, a checkmark is displayed in front of "no control" to indicate a current control mode.

In a third step, the output device displays a description of a control mode in S430.

For example, when the driver presses a description button for "strong control" in the second step, the output device may display information about "strong control" for the "rear window wiper". This information may be stored in the internal memory of the electrical load control apparatus, or may correspond to information collected from each electrical load by the electrical load control apparatus.

In a fourth step, the output device displays a checkmark for the selected control mode in S440.

For example, a checkmark may be displayed when the driver selects "strong control" among control modes, and the checkmark may be displayed in front of the "rear window wiper" corresponding to a control object.

Figure 6:
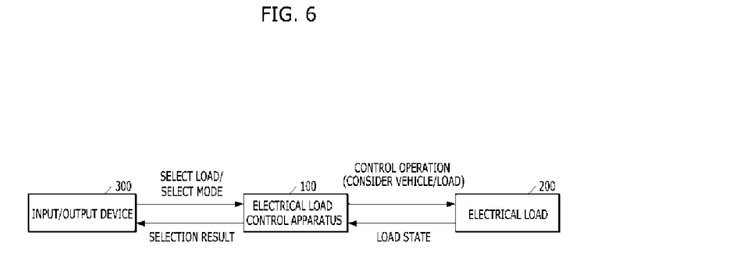
FIG. 6 is a block diagram for description of a driver-friendly electrical load control system according to embodiments of the present disclosure.

FIG. 6 is a diagram for description of a driver-friendly electrical load control system according to embodiments of the present disclosure.

The driver-friendly electrical load control system may include an electrical load control apparatus 100, an electrical load 200, and an input/output device 300.

Components illustrated in FIG. 6 are not essential, and thus it is possible to embody a driver-friendly electrical load control system including more or fewer components.

The electrical load 200 transmits information that indicates a state of the electrical load to the electrical load control apparatus 100.

Thereafter, when an electrical load corresponding to a selected control object and a control mode corresponding to a selected control method are input via the input/output device 300, the electrical load control apparatus 100 delivers a signal corresponding to the control object and the control mode to the electrical load 200 to control an operation of the control object.

In addition, the electrical load control apparatus 100 delivers information about a result of selection of the control mode to the input/output device 300.

Figure 7:
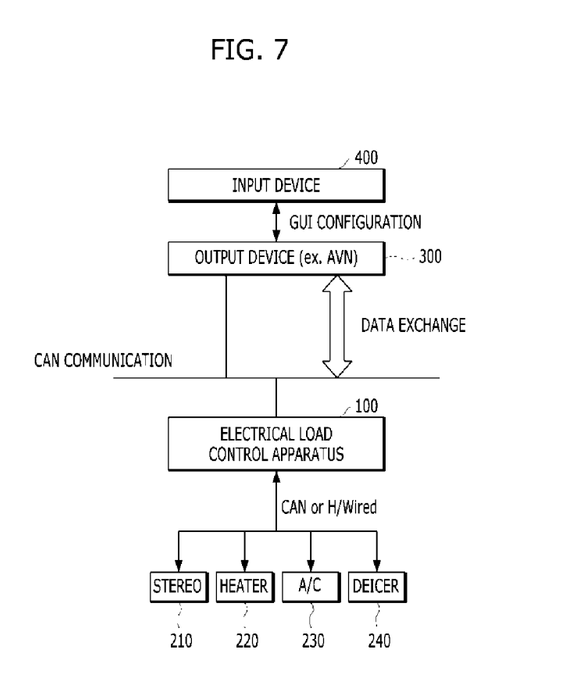
FIG. 7 is a block diagram for detailed description of the driver-friendly electrical load control system according to FIG. 6.

FIG. 7 is a diagram for detailed description of the driver-friendly electrical load control system according to FIG. 6.

The driver-friendly electrical load control system may include electrical loads 210 to 240 connected to the electrical load control apparatus 100 through CAN communication or hardwire, and include an output device 300 and an input device 400 connected to the electrical load control apparatus 100 through CAN communication.

Components illustrated in FIG. 7 are not essential, and thus, it is possible to embody a driver-friendly electrical load control system including more or fewer components. Moreover, the configuration of components illustrated in FIG. 7 may be modified within the scope of the claims herein, as would be understood by a person of ordinary skill in the art.

The input device 400 and the output device 300 may be included in a touchscreen functioning as a display device of an AVN system to perform an input operation and an output operation through a graphical user interface (GUI) provided by the touchscreen as in FIG. 5.

The above description with reference to FIG. 6 is applied to the electrical load control apparatus 100. In addition, a stereo 210, a heater 220, an air conditioner (A/C) 230, and a deicer 240 may be given as examples of an electrical load. However, the electrical load is not limited to the examples of FIG. 7.

Figure 8:
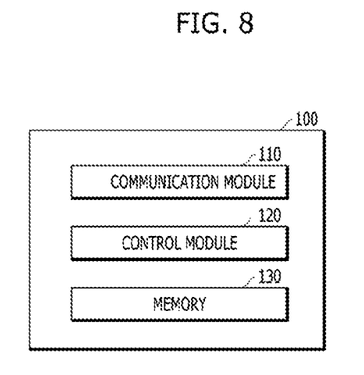
FIG. 8 is a block diagram for description of a driver-friendly electrical load control apparatus according to embodiments of the present disclosure.

FIG. 8 is a diagram for description of a driver-friendly electrical load control apparatus 100 according to embodiments of the present disclosure.

As shown in FIG. 8, the driver-friendly electrical load control apparatus 100 includes a communication module 110, a control module 120, and a memory 130.

Components illustrated in FIG. 8 are not essential, and thus it is possible to embody a driver-friendly electrical load control system including more or fewer components. Moreover, the configuration of components illustrated in FIG. 8 may be modified within the scope of the claims herein, as would be understood by a person of ordinary skill in the art.

Hereinafter, the above components will be described in detail.

The communication module 110 exchanges a signal and information for control of an electrical load with the input device 400, the output device 300 and the electrical loads 210 to 240 of FIG. 7. The communication module 110 may exchange a signal through CAN communication or hardwire communication. However, the disclosure is not limited thereto.

For example, the communication module 110 may receive state information collected from one electrical load, transmit the received state information to the output device, and deliver a signal corresponding to a control method to each of at least one control object.

The control module 120 may perform data processing and calculation to control overall operation of the electrical load control apparatus 100.

For example, the control module 120 may receive at least one control object among one or more electrical loads and a control method for the at least one control object delivered from the input device to identify a selected control object and a selected control method.

The memory 130 is a general term for a space and/or a storage area in which a predetermined program code for control of overall operation of the electrical load control apparatus 100, data input/output when an operation according to the program code is performed, etc. are stored. The memory 130 is provided in a form of an electrically erasable and programmable read only memory (EEPROM), a flash memory (FM), a hard disk drive, etc.

Figure 9:
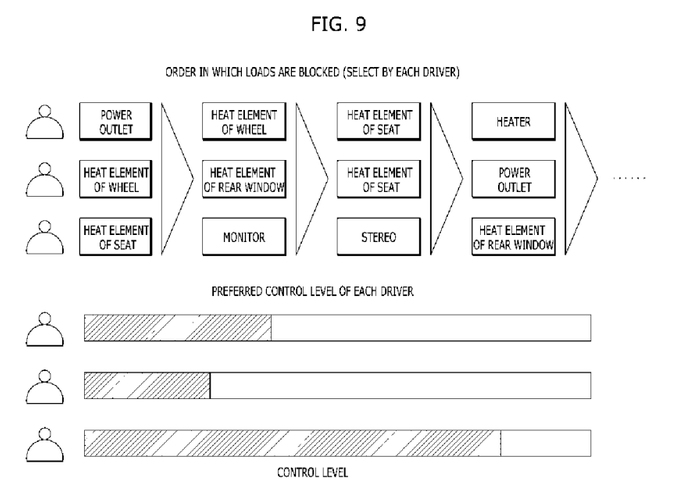
FIG. 9 is a diagram for description of a control object and a control level, in the driver-friendly electrical load control apparatus, according to embodiments of the present disclosure.

FIG. 9 is a diagram for description of a control object and a control level, in the driver-friendly electrical load control apparatus, according to embodiments of the present disclosure.

FIG. 9 will be described with reference to FIG. 3 in terms of setting an object to be controlled. While order of electrical loads to be deactivated is arbitrarily determined in FIG. 3, order of electrical loads to be deactivated may differ according to drivers and thus whether to control an electrical load may be determined based on preference of each driver.

For example, a driver sensitive to cold may assign a low priority to a heating element of a seat, a heater, etc. related to an internal temperature of a vehicle in an order in which electrical loads are blocked. Meanwhile, a driver sensitive to a driving speed of the vehicle may assign a low priority to an electrical load related to a powertrain in an order in which electrical loads are blocked.

In addition, a control level of a control object may be set as a control mode, thereby differently setting the control level according to drivers. For example, a driver sensitive to cold may set a control level of a heater to a relatively low value, and a driver less sensitive to cold may set the control level to a relatively high value.

Some effects of the driver-friendly electrical load control method and apparatus according to the present disclosure are described below.

First, the present disclosure allows a driver to select an object to be controlled among electrical loads of a vehicle such that the electrical loads may be controlled according to preference of each driver, and thus, may reduce degradation of driver convenience.

Second, the present disclosure is effective in enhancing fuel efficiency since electric energy consumption of a vehicle is decreased while degradation of driver convenience is minimized.

Third, more electrical loads can be controlled in the present disclosure since an individual driver may directly select electrical loads to be controlled while the number of controllable electrical loads is restricted in the related art since characteristics of a plurality of drivers need to be considered when electrical loads to be controlled are arbitrarily determined.

Effects that may be obtained from the present disclosure are not limited to the above-mentioned effects, and other effects not mentioned herein may be clearly understood by those skilled in the art from the above description.

Those skilled in the art will appreciate that the present disclosure may be carried out in other specific ways than those set forth herein without departing from the spirit and essential characteristics of the present disclosure. The above embodiments are to be construed in all aspects as illustrative and not restrictive. The scope of the disclosure should be determined by the appended claims and their legal equivalents, not by the above description, and all changes coming within the meaning and equivalency range of the appended claims are to be embraced therein.

What is claimed is:

1. An electrical load control method comprising:
collecting, by an electrical load control apparatus, state information of one or more electrical loads;
receiving, by an output device, the state information of the one or more electrical loads from the electrical load control apparatus;
outputting, by the output device, the state information;
receiving, by an input device, one or more control objects among the one or more electrical loads and control methods for the one or more control objects; and
receiving, by the electrical load control apparatus, a signal corresponding to the received one or more control objects and the received control methods for the one or more control objects from the input device to deliver a signal corresponding to a respective control method for each of the one or more control objects, wherein
the receiving of the signal comprises:
identifying the one or more control objects among the one or more electrical loads; and
identifying a control mode selected from one or more control modes,
the receiving of the one or more control objects and the control methods comprises:
providing, by the input device, information about each of the one or more control modes for each of the one or more control objects,
the state information includes at least one of energy consumption, an influence of fuel efficiency, and a current control mode of the one or more electrical loads, and
the electrical load control apparatus is included in an integrated gateway & power module (IGPM) or an integrated control unit (ICU).

2. The method according to claim 1, wherein the one or more control modes are identified according to control levels of the one or more electrical loads.

3. The method according to claim 2, wherein the one or more control modes correspond to different control levels of the one or more electrical loads by a predetermined threshold value.

4. The method according to claim 1, wherein the one or more control modes are identified according to whether the one or more electrical loads are activated.

5. The method according to claim 1, wherein the one or more control modes are identified according to intervals at which the one or more electrical loads are activated.

6. The method according to claim 1, wherein the electrical load control apparatus is connected to the one or more electrical loads through controller area network (CAN) communication or hardwire.

7. The method according to claim 1, wherein the one or more control objects are classified into at least one combination set in advance for each category.

8. The method according to claim 1, wherein priorities are assigned to the one or more control objects for applying the one or more control modes.

9. An electrical load control apparatus comprising:
a communication module receiving state information collected from one or more electrical loads and transmitting the received state information to an output device; and
a control module receiving one or more control objects among the one or more electrical loads and control methods for the one or more control objects from an input device to identify the received one or more control objects and the received control methods, wherein the communication module delivers a signal corresponding to a respective control method for each of the one or more control objects, and the electrical load control apparatus is included in an integrated gateway & power module (IGPM) or an integrated control unit (ICU).

10. The apparatus according to claim 9, wherein the state information includes at least one of energy consumption, an influence of fuel efficiency, and a current control mode of the one or more electrical loads.

11. The apparatus according to claim 10, wherein the one or more control modes are identified according to control levels of the one or more electrical loads.

12. The apparatus according to claim 11, wherein the one or more control modes correspond to different control levels of the one or more electrical loads by a predetermined threshold value.

13. The apparatus according to claim 10, wherein the one or more control modes are identified according to whether the one or more electrical loads are activated.

14. The apparatus according to claim 10, wherein the one or more control modes are identified according to intervals at which the one or more electrical loads are activated.

15. The apparatus according to claim 10, wherein the communication module exchanges a signal with the one or more electrical loads through CAN communication or hardwire.

16. The apparatus according to claim 10, wherein the one or more control objects are classified into at least one combination set in advance for each category.

17. The apparatus according to claim 10, wherein priorities are assigned to the one or more control objects for applying the one or more control modes.

18. A non-transitory computer-readable medium containing program instructions for controlling an electronic load, the computer readable medium comprising:

program instructions that collect state information of one or more electrical loads;

program instructions that receive the collected state information of the one or more electrical loads;

program instructions that output the state information;

program instructions that receive one or more control objects among the one or more electrical loads and control methods for the one or more control objects;

program instructions that receive a signal corresponding to the received one or more control objects and the received control methods for the one or more control objects to deliver a signal corresponding to a respective control method for each of the one or more control objects;

program instructions that identify the one or more control objects among the one or more electrical loads;

program instructions that identify a control mode selected from one or more control modes; and program instructions that provide information about each of the one or more control modes for each of the one or more control objects, wherein the state information includes at least one of energy consumption, an influence of fuel efficiency, and a current control mode of the one or more electrical loads, and the electrical load control apparatus is included in an integrated gateway & power module (IGPM) or an integrated control unit (ICU).

* * * * *